(12) United States Patent
Garrard

(10) Patent No.: US 11,125,108 B2
(45) Date of Patent: Sep. 21, 2021

(54) LIQUID-COOLED ENCLOSURE FOR TURBOCHARGER POWER MODULE

(71) Applicant: BorgWarner Inc., Auburn Hills, MI (US)

(72) Inventor: Tyler R. Garrard, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 17 days.

(21) Appl. No.: 16/712,269

(22) Filed: Dec. 12, 2019

(65) Prior Publication Data

US 2020/0191014 A1 Jun. 18, 2020

Related U.S. Application Data

(60) Provisional application No. 62/780,701, filed on Dec. 17, 2018.

(51) Int. Cl.
*F01D 25/12* (2006.01)
*F01D 25/16* (2006.01)

(52) U.S. Cl.
CPC .............. *F01D 25/12* (2013.01); *F01D 25/16* (2013.01); *F05D 2220/40* (2013.01); *F05D 2240/50* (2013.01); *F05D 2260/232* (2013.01)

(58) Field of Classification Search
CPC .......... H02K 7/14; H02K 7/1823; H02K 9/19; H02K 11/33; H02K 2211/03; F02B 37/10;
(Continued)

(56) References Cited

U.S. PATENT DOCUMENTS 5,491,370 A * 2/1996 Schneider .............. H02K 7/006
310/54
5,605,045 A 2/1997 Halimi et al.
(Continued)

FOREIGN PATENT DOCUMENTS

| EP | 1049235 A2 | 11/2000 |
| EP | 294852 A1 | 9/2015 |
| JP | 2006197781 A | 7/2006 |

OTHER PUBLICATIONS

European Search Report for related Application No. 19216342.6; dated Apr. 20, 2020.

*Primary Examiner* — Igor Kershteyn
(74) *Attorney, Agent, or Firm* — von Briesen & Roper, s.c.

(57) ABSTRACT

A turbocharger includes a bearing housing containing a motor within an interior portion of the bearing housing. A liquid-cooled power module is secured to an exterior portion of a bearing housing. The power module contains electrical components that power and control speed of the motor, and has an enclosure that includes sealed first and second volumes separated by a common wall. The first volume is a liquid-cooled compartment for removing heat generated from the electrical components, and the second volume is a liquid-free compartment containing the electrical power components. The electrical power components are fixed to the common wall, which is formed of a heat conductive material, and which may include fins extending into the first volume to optimize heat transfer from the common wall into the liquid-cooled compartment. Finally, the liquid-cooled power module communicates with the motor directly through the bearing housing.

15 Claims, 5 Drawing Sheets

(58) Field of Classification Search
CPC ........ F02B 39/005; F02B 39/10; F01D 25/12; F01D 25/16; F05D 2220/40; F05D 2240/50; F05D 2260/232
See application file for complete search history.

(56) References Cited

U.S. PATENT DOCUMENTS

| | | | |
|---|---|---|---|
| 6,141,219 | A | 10/2000 | Downing et al. |
| 6,739,845 | B2 | 5/2004 | Woollenweber |
| 7,436,660 | B2 | 10/2008 | Pedoeem et al. |
| 7,551,439 | B2 | 6/2009 | Peugh et al. |
| 2004/0163409 | A1* | 8/2004 | Nakajima ............... H02K 11/33 62/505 |
| 2004/0189114 | A1* | 9/2004 | Iwashima ............... H02K 11/33 310/68 D |
| 2010/0085778 | A1 | 4/2010 | Saito et al. |
| 2011/0169352 | A1* | 7/2011 | Nagao .................... H02K 9/197 310/59 |
| 2014/0239750 | A1 | 8/2014 | Nagao et al. |

* cited by examiner

LIQUID-COOLED ENCLOSURE FOR TURBOCHARGER POWER MODULE

CROSS-REFERENCE TO RELATED APPLICATIONS

This application claims the benefit of U.S. Patent Application No. 62/780,701 filed on Dec. 17, 2018, the disclosure of which is herein incorporated by reference in its entirety.

TECHNICAL FIELD

This disclosure relates generally to turbochargers that include bearing housings containing electric motors configured to enhance turbocharger speed responses to engine performance demands, and more particularly to liquid cooling of power modules configured to control such electric motors.

BACKGROUND

Hybrid turbochargers are often employed to avoid so-called "turbocharger lag" associated with "standard" turbochargers that rely solely on exhaust gas pressure to operate. When relying only on exhaust gas pressure, turbocharger turbines can often require nearly one second to accelerate to commanded speed. Electric motors enshrouded within turbocharger bearing housings have been used in recent years, particularly in high performance vehicles, to boost acceleration times for improved on-demand engine performance.

Turbocharger environments can be challenging for physical placements of electrical components that provide motor control, as considerable amounts of heat can be generated both within and externally of turbocharger bearing housings in which such motors are housed. As a result, associated motor controls are typically placed on or near turbocharger compressor housings, which are relatively cooler than areas near turbocharger turbine and bearing housings. However, the greater the distance the electronic controls are physically spaced away from the turbocharger motor, the greater the issue of potential electromagnetic interference (EMI).

Ideally, power modules containing motor controls would be mounted to bearing housings to reduce EMI signatures, and to permit direct connections of phase leads from the modules to their associated motors through bearing housings.

SUMMARY

In one described embodiment of the disclosure, a turbocharger bearing includes a motor contained within the bearing housing. A liquid-cooled power module that includes electric power components for controlling the motor is secured to an exterior portion of the bearing housing. The power module has an enclosure that includes sealed first and second volumes separated by a common wall; the first volume defines a liquid-cooled compartment, and the second volume defines a liquid-free compartment for the electrical power components, which are fixed to the common wall. Heat from the power components is transferred through the common wall into the liquid-cooled compartment. The liquid-cooled power module communicates with the motor directly through the bearing housing.

In another described embodiment of the disclosure, a hybrid turbocharger includes a turbocharger bearing housing containing a motor within the bearing housing. A liquid-cooled power module that includes electric power components for controlling the motor is secured to an exterior portion of the bearing housing. The power module has an enclosure that includes sealed first and second volumes separated by a common wall; the first volume defines a liquid-cooled compartment, and the second volume defines a liquid-free compartment for the electrical power components, which are fixed to the common wall. Heat from the power components is transferred through the common wall into the liquid-cooled compartment. The liquid-cooled power module communicates with the motor directly through the bearing housing.

In yet another described embodiment of the disclosure, a method of making a turbocharger bearing housing includes steps of installing an electric motor within an interior of a bearing housing and providing a liquid-cooled power module that includes electric power components for control of the electric motor. The method further includes securing the electric power module to an exterior of the bearing housing, and forming an enclosure for the electric power module to include first and second sealed volumes separated by a common wall. The method further provides that the first volume defines a liquid-cooled compartment, and that the second volume defines a liquid-free compartment for the electrical power components, which are fixed to the common wall so that heat is transferred through the common wall from the power components into the liquid-cooled compartment. Finally, the method also provides that the liquid-cooled power module communicates with the motor directly through the bearing housing.

BRIEF DESCRIPTION OF THE DRAWINGS

One or more embodiments of the disclosure will hereinafter be described in conjunction with the appended drawings, wherein like designations denote like elements, and wherein.

DETAILED DESCRIPTION OF ILLUSTRATED EMBODIMENTS

Figure 1:
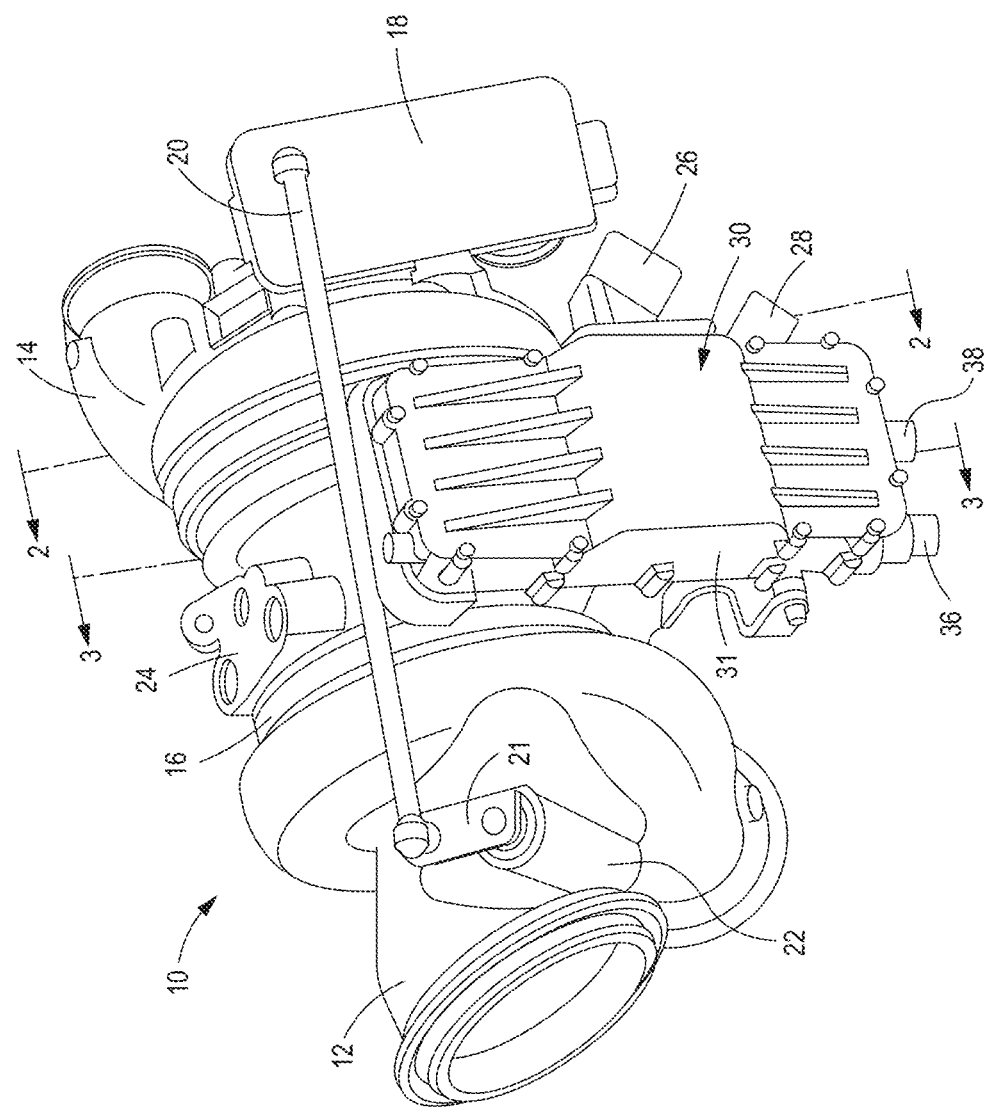
FIG. 1 is a perspective view of a turbocharger that includes a power module constructed in accordance with one embodiment of this disclosure.

Referring initially to FIG. 1, a turbocharger 10 includes a turbine housing 12 at one end, and a compressor housing 14 at the other end. A bearing housing 16 is situated between the turbine housing 12 and the compressor housing 14. Those skilled in the art will appreciate that interior components of the turbocharger will normally include a turbine unit (albeit not shown) within the turbine housing 12, and compressor unit (not show) within the compressor housing 14. A turboshaft (also not shown) rotates within bearings (not shown) within the bearing housing 16, and physically connects the turbine and compressor units.

The turbocharger 10 includes a pressure-boost control actuator 18 coupled to an actuation control rod 20, in turn coupled to an actuator valve arm 21, as shown. The latter elements control a bypass valve assembly 22 which controls wastegate apparatus (not shown) or other valve apparatus to control boost pressure, and to avoid over-pressuring the turbine unit, as those skilled in the art will appreciate. Mounted on the bearing housing 16 is an oil and coolant manifold 24 which contains connection apertures to accommodate movement of the latter fluids into and out of the bearing housing 16.

Figure 2:
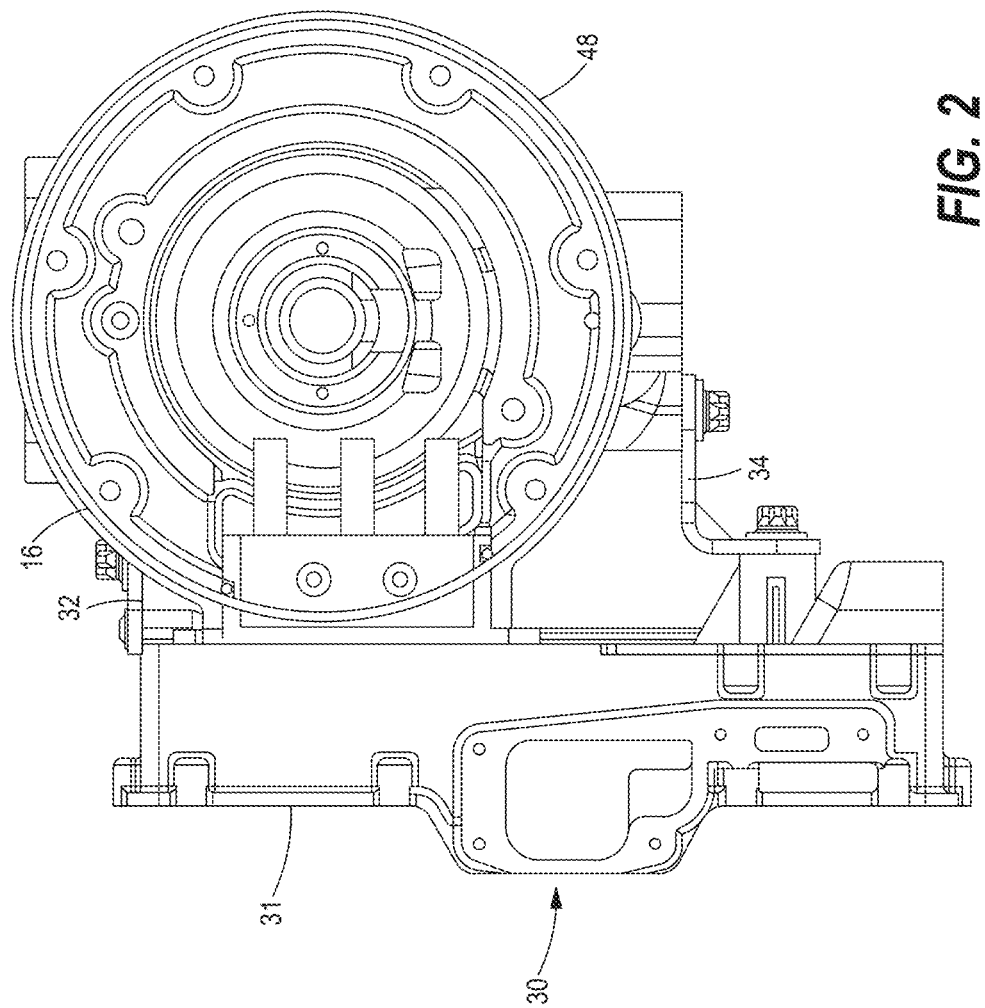
FIG. 2 is an enlarged cross-sectional view of the embodiment of FIG. 1, taken along lines 2-2 of FIG. 1.

Referring now to the view of FIG. 2, a power module 30 includes a sealed protective enclosure 31 that is affixed to the bearing housing 16. For this purpose, upper and lower brackets 32 fixedly support the rectangular or box-shaped power module enclosure 31 in place on the normally rounded exterior portion 48 of the typically annular bearing housing 16. A power socket 26 and a communications socket 28 extend from the enclosure 31 for separately accommodating power and signal management demands of the power module 30.

Figure 3:
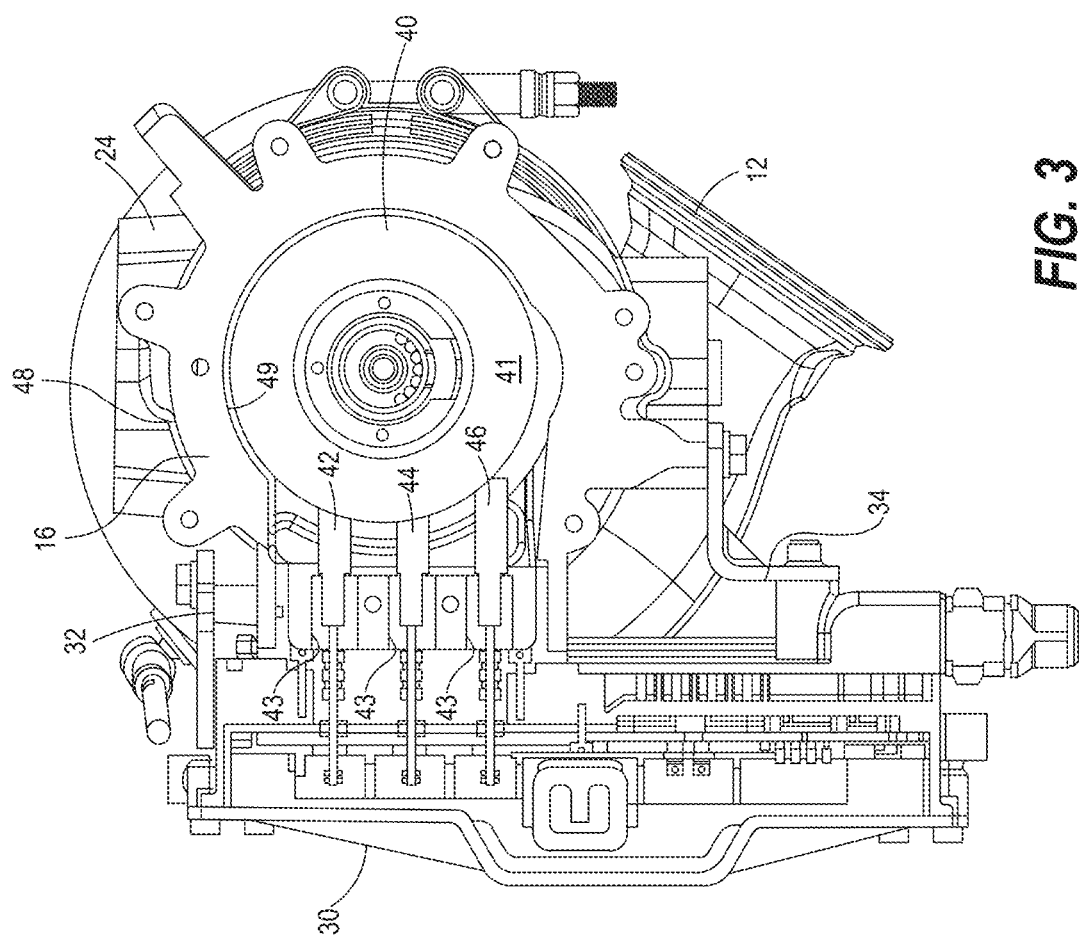
FIG. 3 is another view of the same embodiment of FIG. 1, taken along lines 3-3 thereof.

In the cross-sectional view of FIG. 3, a turbocharger motor 40 is shown situated coaxially within the annular bearing housing 16 to drive the turboshaft upon demand. For this purpose, the power module communicates with the motor 40, which may be a 3-phase motor, as in the embodiment shown, having phase leads 42, 44, and 46 connected to a stator 41 of the motor 40. In the described embodiment, the phase leads pass directly into the power module 30 through sealed bores 43 extending from an interior portion 49 of the bearing housing 16, to the exterior portion 48 thereof.

Figure 4:
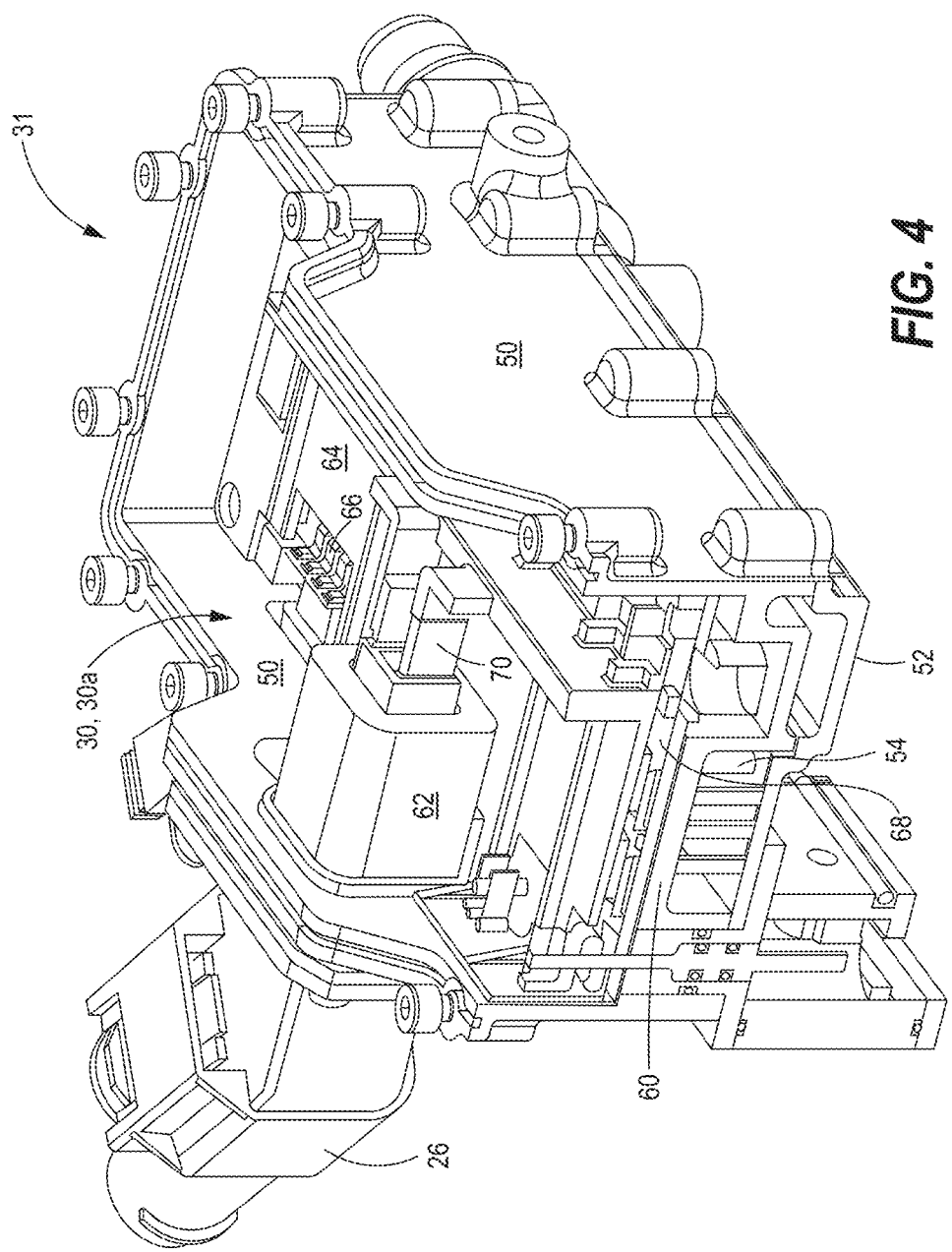
FIG. 4 is a perspective view of the power module, but with portions removed and/or cut away to reveal interior details constructed in accordance with one embodiment of this disclosure.

Referring now to FIG. 4, interior portions of the power module 30 are shown in greater detail. The power module 30 controls power to and speed of the motor 40, which must be rapidly accelerated up to speeds as high as 40-50,000 RPM. For that purpose, components 30a of the power module 30 can include, among other elements, a ferritic snubber 62, a main power connector 70 extending from the snubber 62, a busbar assembly 66, and a printed circuit board (PCB) 68. Additional elements of 30a in the embodiment as disclosed include connections of respective phase lead ends 42', 44', and 46' to and within the power module 30 (see FIG. 5). Each of the components 30a is contained within the sealed enclosure 31, which has dual volumes defining liquid-sealed compartments as will be explained. In the perspective view of FIG. 4, the upper plate of the enclosure 31 has been removed, revealing a pair of side plates 50 and a bottom plate 52 of the enclosure 31. Those skilled in the art will appreciate that the snubber 62 is designed to reduce electromagnetic interference (EMI) in high-powered and/or high-frequency electronic control system environments. In the configuration shown, a plastic over-mold layer 64 is configured to permanently force the busbar contacts against the PCB 68.

Figure 5:
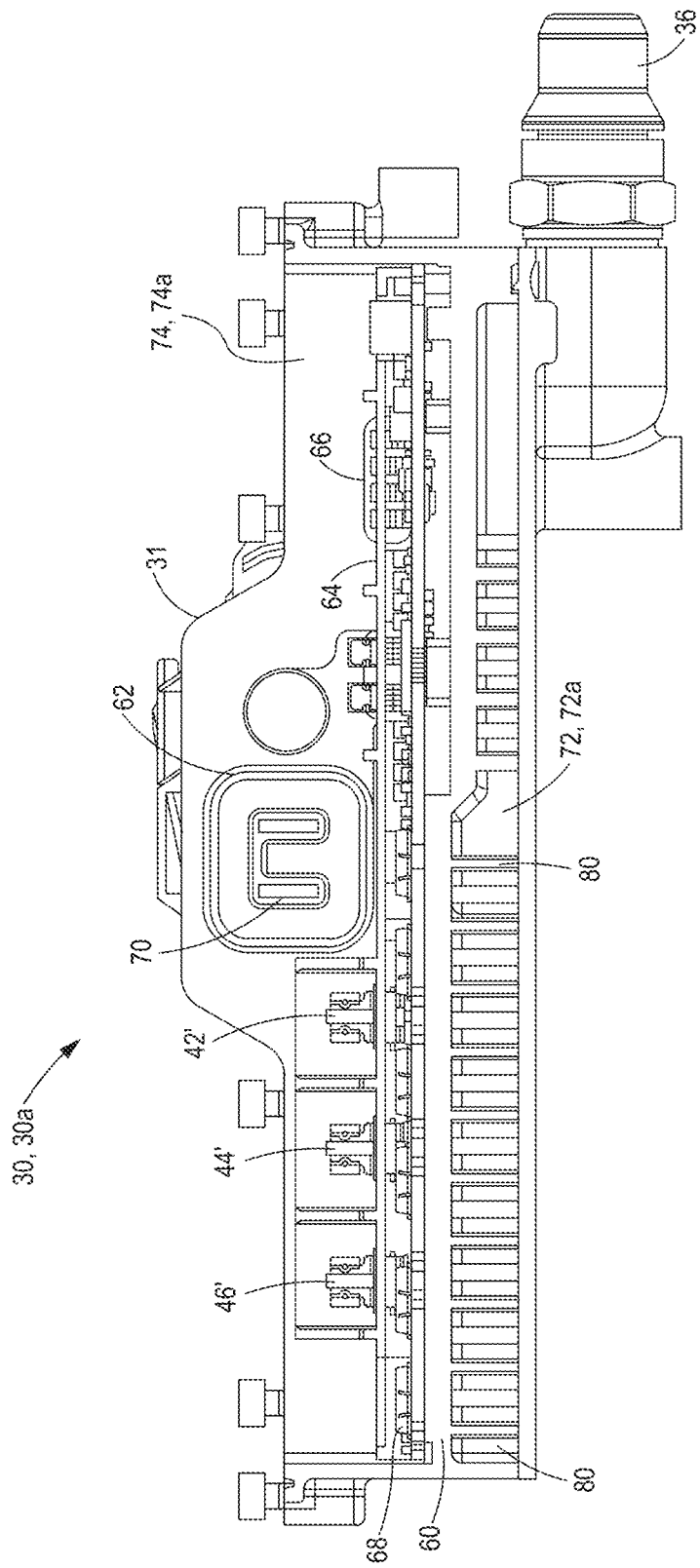
FIG. 5 is a cross-sectional elevation view of the power module of the same embodiment of FIG. 4.

Referring now also to FIG. 5, the enclosure 31 includes a first lower volume 72 having inlet and outlet coolant nozzles 36 and 38 (FIG. 1). The volume 72 defines a liquid-cooled compartment 72a for removal and dissipation of heat generated by the above-described electric components 30a of the power module 30. A second, upper, volume 74 defines a liquid-free compartment 74a configured to contain the electrical components 30a, all of which are mounted on and/or fixed to a common wall 60 situated between the compartments 72a and 74a. For most effective heat transfer into the common wall 60, the components 30a may be secured directly to a thermally conductive pad, adhesive, or even to conductive putty applied between the components 30a and the upper surface of the common wall 60.

In the described embodiment, the enclosure 31, which includes the common wall 60, may be formed of aluminum or other heat conductive material, particularly to ensure effective transfer and dissipation of heat from the common wall 60 into the liquid-cooled compartment 72a. The common wall 60 may also include fins 80 that extend from the common wall 60 and into the compartment 72a, as shown, for optimizing heat transfer into the liquid-cooled compartment 72a. Obviously the fins 80 would be arranged in a manner to minimize impedance of flows of cooling fluid through flow channels 54 (FIG. 4).

Finally, for providing effective protection of the power module 30, including its electrical components 30a, the compartments 72a and 74a may be hermetically sealed from each other, as well as from the external turbocharger environment.

A method of making a turbocharger bearing housing may include steps of installing an electric motor 40 within an interior 49 of a bearing housing 16 and providing a liquid-cooled power module 30 that includes electric power components 30a for controlling the electric motor. The method may further include securing the power module 30 to an exterior 48 of the bearing housing, and forming an enclosure for the power module that includes first and second sealed volumes 72, 74 separated by a common wall 60. The method may further provide that the first volume 72 defines a liquid-cooled compartment 72a, and that the second volume 74 defines a liquid-free compartment 74a for the electrical power components 30a, the latter power components being fixed to the common wall, so that heat is transferred through the common wall from the power components into the sealed liquid-cooled compartment. Finally, the method also provides that the liquid-cooled power module 30 communicates with the motor 40 directly through the bearing housing 16.

INDUSTRIAL APPLICABILITY

The described embodiment of the hybrid turbocharger can be useful in a wide variety of applications that may benefit from this disclosure. Placement of the power module 30 physically on the bearing housing provides an effective way to minimize EMI signatures often associated with turbocharger motor controls. In addition, although the described turbocharger 10 may be used to enhance on-demand vehicular engine performance, other environments and uses involving non-vehicular applications may be amenable for the disclosed technology.

Moreover, it is to be understood that the foregoing may be a description of only one embodiment of the disclosure. However, the disclosure is not limited to the particular embodiment(s) disclosed. For example, with appropriate modification the phase leads could be oriented and/or contained within the bearing housing in other configurations that are not shown nor described herein. Moreover, statements contained in the description that relate only to particular embodiments are not to be construed as limitations on scope of the disclosure, or on specific terms used in the claims, except where a term or phrase may have otherwise been expressly defined. Various other embodiments, changes, and modifications to the disclosed embodiment(s) will be apparent to those skilled in the art, and are intended to fall within the spirit and scope of the appended claims.

As used in this disclosure, various terms "e.g.," "for example," "for instance," "such as," and "like," and verbs "comprising," "having," "including," and other verb forms, when used in conjunction with a listing of one or more components or other items, are to be construed as open-ended, meaning that the listing is not to be considered as excluding other or additional components or items. All terms are to be given their broadest reasonable meanings unless used in contexts that clearly require specific interpretations.

The invention claimed is:

1. A bearing housing comprising:
   a motor contained within the bearing housing;
   a power module secured to an exterior portion of the bearing housing, the power module containing electrical components that power and control speed of the motor, the power module having an enclosure that includes sealed first and second volumes separated by a common wall;
   the first volume defining a liquid-cooled compartment;
   the second volume defining a liquid-free compartment that contains the electrical components, the electrical components being fixed to the common wall;
   wherein heat is transferred from the electrical components through the common wall into the liquid-cooled compartment; and
   wherein the power module communicates with the motor directly through the bearing housing.

2. The bearing housing of claim 1, wherein the motor has at least one phase lead extending directly from the motor through the bearing housing and into the power module.

3. The bearing housing of claim 1, wherein the motor is a three phase motor.

4. The bearing housing of claim 3, wherein at least three phase leads are affixed to a stator of the motor, the phase leads extending directly from the motor through the bearing housing and into the power module.

5. The bearing housing of claim 1, wherein the power module is secured to the bearing housing by brackets, and wherein the defined enclosure of the power module is formed of aluminum.

6. The bearing housing of claim 1, wherein the power module includes separate communication and power sockets, and wherein the power socket includes a ferrite snubber for limiting electromagnetic interference.

7. The bearing housing of claim 1, wherein the power module includes a printed circuit board, separate busbar contacts, and a plastic over-mold layer within the second volume, wherein the plastic over-mold layer is configured to permanently force the busbar contacts against the printed circuit board.

8. A turbocharger comprising:
   a turbocharger bearing housing containing a motor within the bearing housing:
   a power module secured to an exterior portion of the bearing housing;
   the power module containing electrical components that power and control speed of the motor, the power module having an enclosure that includes sealed first and second volumes separated by a common wall, the first volume providing a liquid-cooled compartment, the second volume providing a liquid-free compartment that contains the electrical power components, the electrical components being fixed to the common wall;
   wherein heat from the power components is transferred through the common wall into the liquid-cooled compartment, and
   wherein the liquid-cooled power module communicates with the motor directly through the bearing housing.

9. The turbocharger of claim 8, wherein the motor has at least one phase lead extending directly from the motor through the bearing housing and into the power module.

10. The turbocharger of claim 8, wherein the motor is a three phase motor.

11. The turbocharger of claim 10, wherein at least three phase leads are affixed to a stator of the motor, the phase leads extending directly from the motor through the bearing housing and into the power module.

12. The turbocharger of claim 8, wherein the power module is secured to the bearing housing by brackets, and wherein the defined enclosure of the power module is formed of aluminum.

13. The turbocharger of claim 8, wherein the power module includes separate communication and power sockets, and wherein the power socket includes a ferrite snubber for limiting electromagnetic interference.

14. The turbocharger of claim 8, wherein the power module includes a separate communication and power sockets, and wherein the power socket includes a ferrite snubber for limiting electromagnetic interference.

15. A method of making a turbocharger bearing housing, includes steps of:
   installing an electric motor within an interior of a bearing housing;
   providing a liquid-cooled power module that includes electric power components for controlling the electric motor, and securing the electric power module to an exterior of the bearing housing;
   forming an enclosure for the power module to include first and second sealed volumes separated by a common wall;
   fixing the electrical power components to the common wall;
   wherein the first volume defines a liquid-cooled compartment for cooling the electrical power components, and the second volume defines a liquid-free compartment containing the electrical power components;
   wherein heat is transferred through the common wall from the electrical power components into the sealed liquid-cooled compartment; and
   wherein the liquid-cooled power module communicates with the motor directly through the bearing housing.

* * * * *